United States Patent [19]

Simon et al.

[11] Patent Number: 4,631,344

[45] Date of Patent: Dec. 23, 1986

[54] PHOTOGRAPHIC PRODUCTS AND PROCESSES

[75] Inventors: Myron S. Simon, West Newton; David P. Waller, Lexington, both of Mass.

[73] Assignee: Polaroid Corporation, Cambridge, Mass.

[21] Appl. No.: 728,210

[22] Filed: Apr. 29, 1985

Related U.S. Application Data

[62] Division of Ser. No. 644,915, Aug. 27, 1984, Pat. No. 4,535,051.

[51] Int. Cl.$^4$ .................. C07D 277/04; C07D 277/06
[52] U.S. Cl. ..................................... 548/146; 546/280; 548/200
[58] Field of Search .................... 548/146; 546/280

[56] References Cited

U.S. PATENT DOCUMENTS

| | | | |
|---|---|---|---|
| 3,719,489 | 3/1973 | Cieciuch et al. | 96/29 D |
| 4,098,783 | 7/1978 | Cieciuch et al. | 260/147 |
| 4,468,448 | 8/1984 | Rogers et al. | 430/222 |
| 4,468,449 | 8/1984 | Arbree et al. | 430/222 |
| 4,468,450 | 8/1984 | Meneghini et al. | 430/222 |
| 4,468,451 | 8/1984 | Foley | 430/222 |

FOREIGN PATENT DOCUMENTS

2036994 7/1980 United Kingdom .

*Primary Examiner*—Robert Gerstl
*Attorney, Agent, or Firm*—Gaetano D. Maccarone

[57] ABSTRACT

Photographic products and processes for the imagewise generation of a dye from a color shifted dye precursor of a preformed image dye, said precursor having at least one

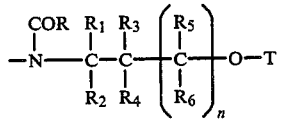

group, wherein R is hydrogen, alkyl, provided that the α-carbon does not have a hydrogen atom attached thereto, aryl such as phenyl or substituted phenyl, e.g. p-nitrophenyl, or heterocyclic such as pyridine; $R_1$–$R_6$ are hydrogen, alkyl, preferably having from 1 to 6 carbon atoms, or aryl; n is 0 or 1; and T is a moiety containing a thiazolidin-2-yl group which upon silver-assisted cleavage of said thiazolidin-2-yl group results in the formation of a

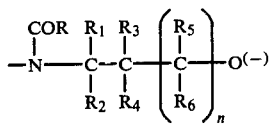

group, which may be protonated under the reaction conditions, followed by cleavage of said

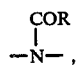

which cleavage is anchimerically assisted or accelerated by said

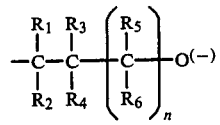

to provide after protonation, an

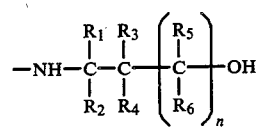

group in a dye chromophore.

In a preferred embodiment the precursor is a substantially colorless compound.

6 Claims, No Drawings

PHOTOGRAPHIC PRODUCTS AND PROCESSES

This is a division of application Ser. No. 644,915, filed Aug. 27, 1984 now U.S. Pat. No. 4,535,051.

BACKGROUND OF THE INVENTION

This application relates to photographic products and processes for forming a dye image from a colorless precursor of a preformed image dye and to novel compounds which are useful in such products and processes.

U.S. Pat. No. 3,719,489 describes and claims photographic processes employing initially photographically inert compounds which are capable of undergoing cleavage in the presence of the imagewise distribution of silver ions made available during processing of a silver halide emulsion to liberate a reagent, such as, a photographically active reagent or a dye in an imagewise distribution corresponding to that of said silver ions. In one embodiment disclosed therein, color images are produced by using as the photographically inert compounds, color providing compounds which are substantially non-diffusible in the photographic processing composition but capable of undergoing cleavage in the presence of the imagewise distribution of silver ions and/or soluble silver complex made available in the undeveloped and partially developed areas of a silver halide emulsion as a function of development to liberate a more mobile and diffusible color-providing moiety in an imagewise distribution corresponding to the imagewise distribution of said ions and/or said complex. The subsequent formation of a color image is the result of the differential in diffusibility between the parent compound and liberated color-providing moiety whereby the imagewise distribution of the more diffusible color-providing moiety released in the undeveloped and partially developed areas is free to transfer. Color-providing compounds useful in the above processes form the subject matter of U.S. Pat. No. 4,098,783, a continuation-in-part, of said U.S. Pat. No. 3,719,489.

Compounds disclosed in the aforementioned patents as useful in liberating a reagent in the presence of said silver ions and/or silver complex are sulfur-nitrogen compounds containing the group

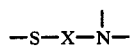

or —S—X—N= wherein X is

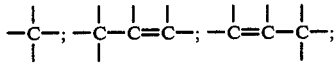

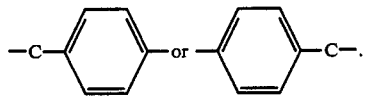

These sulfur-nitrogen compounds may be linear or cyclic in structure, and in a particularly preferred embodiment are cyclic compounds, such as thiazolidine compounds which comprise a colored dye radical having a chromophoric system of an azo, anthraquinone, phthalocyanine or other dye and a thiazolidine-2'-yl moiety which may be bonded directly to said dye radical or indirectly through an appropriate linking group. For example, the linking group may be —CH$_2$CH$_2$O— as in compound (33) at line 10, column 22, of said U.S. Pat. No. 3,719,489, or it may be CH$_2$CH(CH$_3$)N< as in compound (34) in column 35 of said U.S. Pat. No. 4,098,783.

Copending commonly assigned U.S. application Ser. No. 500,414, filed June 2, 1983 now U.S. Pat. No. 4,468,450 discloses photographic processes and products for forming an image in dye from a colorless precursor of a preformed image dye which is substituted with a moiety containing a thiazolidinyl group, said thiazolidinyl group (a) being capable of undergoing cleavage imagewise in the presence of an imagewise distribution of silver ion and/or soluble silver complex and (b) possessing a substituent on the carbon atom in the 2-position which, upon cleavage of the thiazolidinyl group, undergoes a $\beta$-elimination reaction followed by an intramolecularly assisted displacement reaction, which moiety maintains the precursor in its colorless form at least until said thiazolidinyl group undergoes cleavage.

For a definition of a $\beta$-elimination reaction see J. March, Advanced Organic Chemistry, Reactions, Mechanisms and Structure, 2nd Ed., 1977, McGraw Hill, N.Y., pp. 895–922, particularly pp. 904–908. For a discussion of anchimeric assistance see J. March, op cit pp. 280, 310 and 311.

The present invention relates to photographic products and processes which exploit another sequence of reactions to form image dyes from a color shifted dye precursor of a preformed image dye. According to the present invention the acyl group which color shifts or decolorizes the dye chromophore is independent of the assisting group thereby being capable of providing surprisingly faster generation of the image dye in the photographic process.

SUMMARY OF THE INVENTION

It is therefore an object of the invention to provide photographic products and processes for forming a dye image from a color shifted dye precursor of a preformed image dye.

It is another object to provide such products and processes for forming a dye image from a substantially colorless precursor of a preformed image dye.

Another object is to provide such products and processes wherein said color shifted dye precursor includes a thiazolidine group and the thiazolidine group undergoes imagewise silver-catalyzed cleavage in the presence of an imagewise distribution of silver ion and/or soluble silver complex thereby initiating a sequence of reactions which provides the image dye.

A further object is to provide novel compounds which are useful in said products and processes.

BRIEF SUMMARY OF THE INVENTION

These and other objects and advantages are accomplished in accordance with the invention by providing photographic products and processes for forming a dye image from a color shifted dye precursor of a preformed image dye, said precursor having at least one

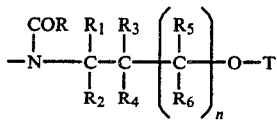

group, wherein R is hydrogen, alkyl, provided that the α-carbon does not have a hydrogen atom attached thereto, aryl such as phenyl or substituted phenyl, e.g., nitrophenyl or a heterocyclic group such as pyridine; $R_1$–$R_6$ are each independently hydrogen, alkyl, preferably having from 1 to 6 carbon atoms, e.g. methyl, isopropyl, etc., or aryl such as phenyl; n is 0 or 1; and T is a moiety containing a thiazolidin-2-yl group which upon silver assisted cleavage of said thiazolidin-2-yl group results in the formation of a

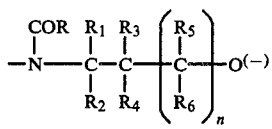

group, which may be protonated under the reaction conditions, followed by cleavage of said

which cleavage is anchimerically assisted or accelerated by said

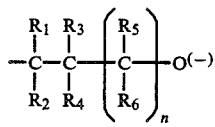

to provide, after protonation, an

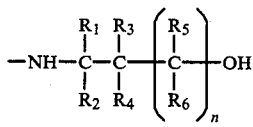

group in a dye chromophore. In a preferred embodiment the color shifted dye precursor is a substantially colorless compound.

The nitrogen-carbon bond in the

moiety is stable to the alkaline photographic processing conditions in the absence of the anchimerically assisting or accelerating group and the introduction of the —COR group in the nitrogen containing dye has the effect of color shifting or substantially decolorizing the dye.

Thus, the invention involves the use of color shifted, preferably substantially colorless, compounds which are precursors of a preformed image dye and these compounds possess the property of remaining color shifted or substantially colorless in the aqueous alkaline medium present during the photographic development period as long as silver ions and/or soluble silver complexes are not present. However, these color shifted compounds will be converted to their previous colored state rapidly during photographic processing when silver ions and/or soluble silver complexes are present in the alkaline medium.

These color shifted or substantially colorless compounds are obtained by shifting the absorption peaks of the preformed image dyes to a different position in the visible spectrum, or in the case of the substantially colorless compounds by shifting the absorption peaks which had been in the visible region of the spectrum (400–700 nm) into the ultraviolet region (below 400 nm), by acylating the —NH group(s) which are responsible for converting the chemical framework of the molecule into a dye. The rate of cleavage of the acylamide group(s) to regenerate the dye is typically too slow for the conventional photographic processes in the absence of an anchimerically assisting or accelerating nucleophile which is generated according to the invention by a silver-assisted or catalyzed cleavage reaction.

The imagewise release of the anchimerically assisting or accelerating group

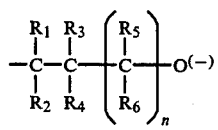

which acts to cleave the acyl group on the color shifted dye precursor thereby regenerating the colored dye species can be achieved through a β-elimination reaction or by ester hydrolysis from a moiety which is generated by silver-catalyzed cleavage of a thiazolidine group. The thiazolidine group is selected so as to have specific properties which will make it useful in the photographic process. The selection of the acyl group(s) is such that the acylamide color shifted compounds formed have adequate stability so that they remain color shifted under the conditions of photographic development in the absence of silver ion and/or soluble silver complexes but are cleaved rapidly within the required photographic time frame in the presence of silver ion and/or soluble silver complex. Thus, by suitable selection of such acyl groups in the synthesis of the color shifted dye precursor compounds it is possible to control the rate of cleavage and consequently the rate at which a dye image is formed according to the invention.

In one embodiment then, the present invention relates to a photographic color process which provides a dye image, the process involving the steps of photoexposing a photosensitive element containing a silver halide emulsion, the latter having associated with it a color shifted dye precursor of a preformed image dye, preferably a substantially colorless precursor, developing said exposed silver halide emulsion to form an image in developed silver and an imagewise distribution of silver ions and/or soluble silver complex in the partially developed and undeveloped areas of the emulsion and forming as a function of said development a color dye image from said color shifted dye precursor.

The color shifted image dye-providing precursor compounds which are utilized in the photographic products and processes of the invention may be represented by the formula

D—T wherein D is

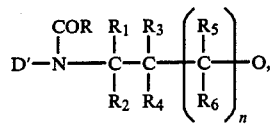

and D', together with

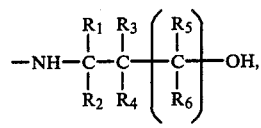

is a preformed dye chromophore; and T, $R_1$–$R_6$ and n are as previously defined.

In a preferred embodiment T can be represented by the group —L—T' where T' is a thiazolidin-2-yl group and L is a moiety capable of undergoing a $\beta$-elimination reaction following cleavage of said thiazolidin-2-yl group, or of undergoing an ester hydrolysis reaction following cleavage of said thiazolidin-2-yl group.

$\beta$-Elimination reactions are well known in the art and involve the breaking of bonds, for example, a C—N, C—O, C—S, C—Se, N—N, N—O or other bond to release a leaving group containing the hetero atom, which in this instance would comprise

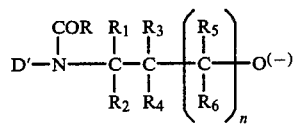

that ultimately would release the dye by the anchimerically assisted or accelerated cleavage reaction. Cleavage of the thiazolidine group generates an aldehyde or aldiminium ion which activates the proton on the $\beta$-carbon to attack by a base, leaving a pair of electrons free to move to the $\beta$-carbon and releasing the leaving group from the $\beta$-carbon atom. Any moiety that undergoes $\beta$-elimination may be employed as L in the compound formula above provided that the elimination rate and the rate of the anchimerically assisted or accelerated cleavage reaction taken with the silver assisted cleavage rate provides the image dye at a photographically useful rate in a given photographic system. The rate constants for various leaving groups in elimination reactions of $\beta$-substituted sulphones, $\beta$-substituted phenyl ketones and $\beta$-substituted esters have been reported by Charles J. M. Stirling et al, J. Chem. Soc. (B), 1970 pp. 672 and 684; Charles J. M. Stirling et al, J. Chem. Soc. Chem. Comm., 1975, page 941; and Charles J. M. Stirling, Acc. Chem. Res. 12, 1979 pp. 198–203. Examples of some leaving group from a carbon system include —SMe; —SPh; —SePh; —OPh, —OMe; —P(O)(OEt)$_2$, —N(Me)Ts; —N(Me)Ac; —N(Ph)Ac; —N(Ph)Ts; —N(Ph)CO$_2$CH$_2$Ph and —N(Me)CO$_2$Ph wherein Me, Et, Ph, Ac and Ts represent methyl, ethyl, phenyl, acetyl, and tosyl respectively. However, the rate of elimination of the leaving group according to the present invention is surprisingly faster than might have been expected in view of the reported values.

Thus, according to the invention, the $\beta$-elimination or ester hydrolysis reaction which occurs as a result of the cleavage of the thiazolidinyl group is used to generate a neighboring, or leaving, group as illustrated above which anchimerically assists or accelerates the cleavage of the amide group

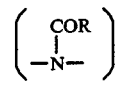

to provide the imagewise distribution of dye.

The image dye released from the color shifted dye precursor compounds may be any suitable dye having an —NH group or groups the acylating of which markedly affects the absorption peak of the dye. Typical suitable general classes of dyes include, for example, anthraquinone, acridine, azo, aminotriphenylmethane, xanthene and naphthoquinone dyes.

DESCRIPTION OF THE PREFERRED EMBODIMENTS

One class of preferred compounds according to the invention is represented by the formula

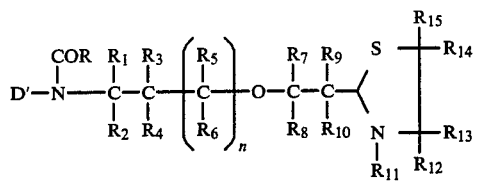

wherein $R_7$, $R_8$ and $R_9$ may be hydrogen, alkyl, preferably having from 1 to 6 carbon atoms; aryl such as phenyl, aralkyl such as benzyl or phenethyl or alkaryl; $R_{10}$ may be hydrogen or a group that can be removed upon cleavage of the thiazolidinyl group to leave an electron pair, e.g., a carboxy group; $R_{11}$ may be alkyl, aryl, aralkyl or alkaryl; $R_{12}$ may be hydrogen, carboxy, N,N-dialkylcarboxamido, alkyl, aryl, aralkyl or alkaryl; and $R_{13}$, $R_{14}$ and $R_{15}$ each may be hydrogen, alkyl, aryl, aralkyl or alkaryl.

Particularly preferred compounds within this class are represented by the formulas (A)
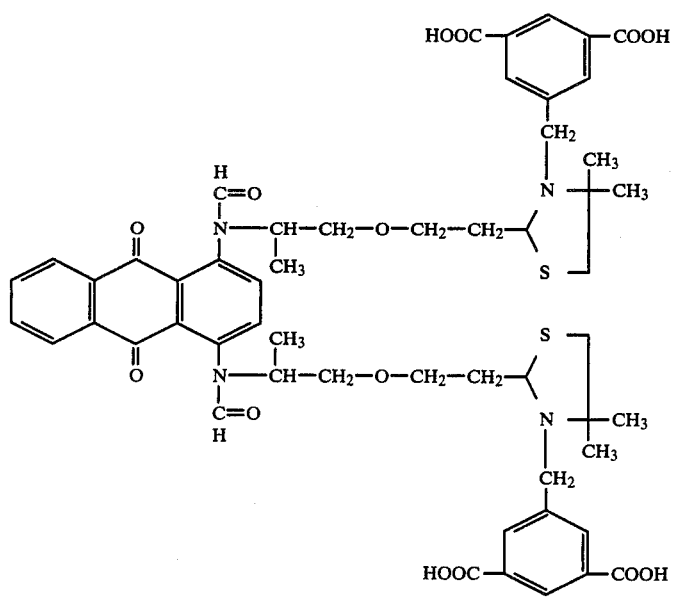
(B)
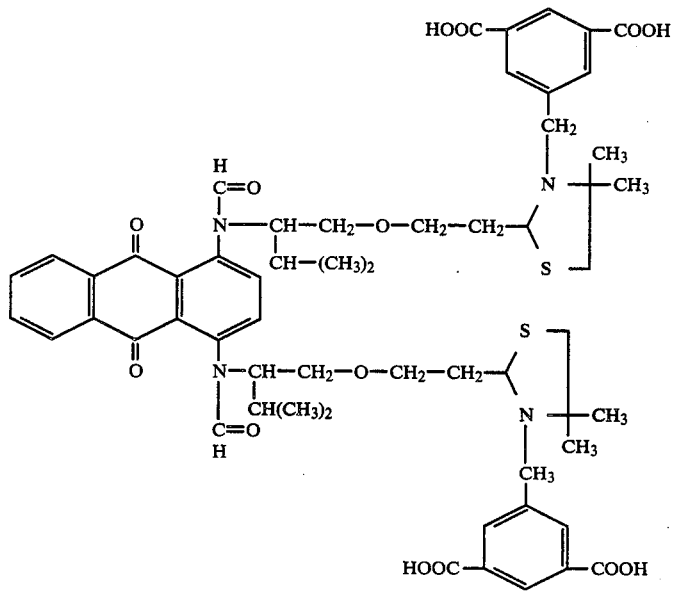
(C)
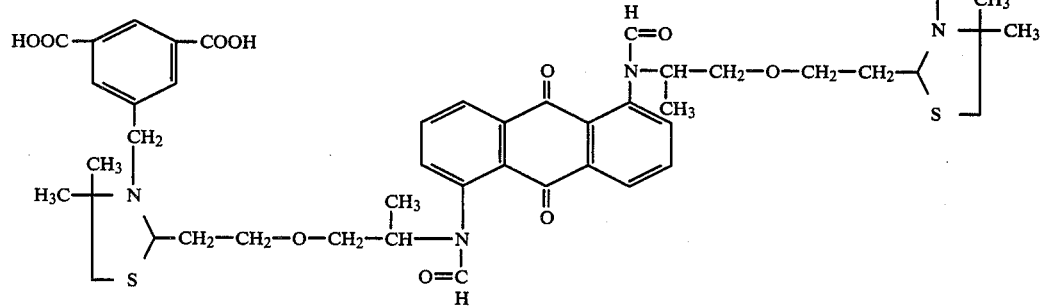

Another preferred class of compounds according to the invention is represented by the formula

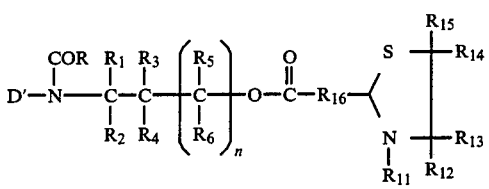

wherein $R_{16}$ may be alkylene having 2 or 3 carbon atoms which may be further substituted with alkyl groups having from 1 to 6 carbon atoms which may form a ring or a fused ring system; or aryl such as phenyl to which the thiazolidine group and —CO— are attached ortho to each other; and D', $R_1$–$R_{15}$ and n are as previously defined.

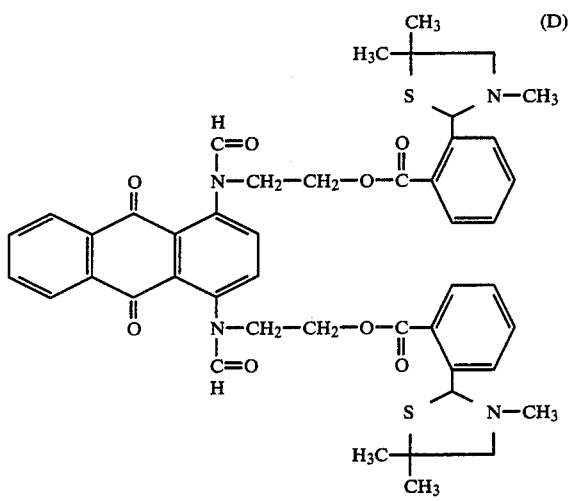

In the substituents noted above for R–$R_{16}$ typical aryl groups include phenyl and naphthyl; typical alkyl groups are preferably lower alkyl having from 1 to 6 carbon atoms, for example, methyl, ethyl, isopropyl, etc.; typical aralkyl groups include phenyl-substituted alkyl wherein said alkyl preferably has from 1 to 6 carbon atoms; and typical alkaryl groups include alkyl-sbstituted phenyl wherein said alkyl preferably has from 1 to 6 carbon atoms.

The compounds of the present invention may be synthesized according to techniques which are known in the art and these will be apparent from the specific examples provided herein.

As noted previously, the present invention is concerned with the formation of a color image from certain image dye-providing compounds comprising a color shifted precursor of a preformed image dye. In this embodiment, the image dye-providing compound may be present initially in the photosensitive element in a layer or layers other than the layer containing the light-sensitive silver halide emulsion, or it may be in the light-sensitive layer itself. For example, it may be in a layer on one side of the emulsion or in two layers, one on either side of the emulsion. If desired, it may be separated from the emulsion layer by one or more spacer layers. Where the image dye-providing compound is present in the light-sensitive layer, the compound should be inert, that is photographically innocuous in that it does not adversely affect or impair image formation. If not photographically innocuous, the compound may be modified in a manner which does not interfere with the development process in any way, but which deactivates the compound so that it does not affect adversely the light-sensitive emulsion. Rather than being disposed in the photosensitive element, the image dye-providing compound may be initially contained in a layer associated with an image-receiving layer in processes such as diffusion transfer processes where image-receiving elements are employed.

The formation of color images according to the subject invention is applicable to the preparation of both monochromatic and multicolor images. For example, the image dye-providing compounds of this invention may be employed in photographic systems utilizing multilayer photosensitive elements comprising at least two selectively sensitive silver halide emulsion strata having said image dye-providing compounds associated therewith which are processed simultaneously and without separation to provide a multicolor image. In such a structure, a barrier interlayer of silver complex scavenger, e.g., silver precipitant may be used, to confine diffusion of soluble silver complex to the appropriate stratum. Also, filter layers containing, e.g., bleachable filter dyes of the type described in U.S. Pat. Nos. 4,304,833, 4,358,118 and 4,304,834 may be used to control the spectral composition of light falling on the underlying light-sensitive layer. Another useful structure for obtaining multicolor images is the screen type negative described in U.S. Pat. No. 2,968,554 or that described in U.S. Pat. No. 3,019,124.

According to one method of forming color images, both the image dyes and their parent compounds comprising the color shifted precursor of a preformed image dye are substantially non-diffusible from their initial position in association with the photosensitive strata. To achieve the requisite non-diffusibility, the parent compound may be appropriately substituted with an immobilizing group, e.g., a long chain alkyl group, and the image dye released may be a dye that is substantially non-diffusible by nature or it may be rendered non-diffusible by appropriate substitution with an immobilizing group, by including a mordant in the same layer with said image dye or by other means that would prevent the dye from diffusing from the photosensitive element.

Though the developed silver present in the photosensitive element after image formation and any remaining silver halide may be removed in a conventional manner, for example, by a bleach-fix bath, it is preferred to bleach the developed silver and to complex residual silver halide in situ. In a particularly preferred embodiment, the silver halide emulsion employed is one which upon development contains low covering power silver in the developed areas whereby the need for bleaching is obviated. In these embodiments, it will be appreciated that the silver halide developing agents, the silver halide solvents and other reagents employed should be substantially non-staining.

Rather than forming monochromatic and multicolor images non-diffusible from the photosensitive element, it will be appreciated that the image dyes provided by the parent compounds may be diffusible to form the color image on a single common image-receiving layer. In this embodiment, the subsequent formation of a color transfer image preferably employs a differential in diffusibility between the parent compound and the liberated dye. This differential in diffusibility may be achieved in a known manner by the appropriate selection of an immobilizing group(s), such as a long chain alkyl or alkoxy group and/or solubilizing group(s), such as, hydroxy, carboxy or sulfo groups.

In the latter embodiments, where the image dyes released are diffusible, the photosensitive layer and the image-receiving layer may be in separate elements which are brought together during processing and thereafter retained together as the final print or separated following image formation, or the photosensitive and image-receiving layers may be in the same element. For example, the image-receiving layer may be coated on a support and the photosensitive layer coated on the surface of the image-receiving layer. The processing composition may be applied to the combined negative-positive element using a spreader sheet to facilitate spreading the liquid composition in a uniform layer adjacent the surface of the photosensitive layer. The image-receiving layer carrying the color image may be separated from the overlying photosensitive layer(s), e.g., with the aid of a stripping layer, or the color image may be viewed as a reflection print by employing a light-reflecting layer between the photosensitive and image-receiving layers.

Illustrative of still other film units are those where the negative and positive components together comprise a unitary structure and are laminated and/or otherwise physically retained together at least prior to image formation. Generally, such film units comprise a plurality of layers including a negative component comprising at least one light-sensitive layer, e.g., a silver halide layer and a positive component comprising an image-receiving layer which components are laminated together or otherwise secured together in physical juxtaposition as a single structure.

Included among such structures are those adapted for forming a transfer image viewable without separation, i.e., wherein the positive component containing the transfer image need not be separated from the negative component for viewing purposes. In addition to the aforementioned layers, such film units include means for providing a reflecting layer between the image-receiving and negative components in order to mask effectively the silver image or images formed as a function of development of the silver halide layer or layers and also to provide a background for viewing the transfer image in the receiving component, without separation, by reflected light. This reflecting layer may comprise a preformed layer of a reflecting agent included in the film unit or the reflecting agent may be provided subsequent to photoexposure, e.g., by including the reflecting agent in the processing composition.

The aforementioned layers are preferably carried on a support and preferably are employed with another support positioned on the opposed surface of the layers carried by the first support so that the layers are sandwiched or confined between the support members, at least one of which is transparent to permit viewing of the final image. Such film units usually are employed in conjunction with means, such as, a rupturable container containing the requisite processing composition and adapted upon application of pressure of applying its contents to develop the exposed film unit. Film units of this type are now well known and are described, for example, in U.S. Pat. Nos. 3,415,644, 3,415,645, 3,594,164 and 3,594,165.

The processing composition employed comprises an aqueous solution and usually an aqueous alkaline solution of a silver halide developing agent and a silver halide solvent. The named ingredients may be present intially in the aqueous medium or may be present initially in the photographic film unit, for example, in the emulsion and/or image-receiving and/or spacer layers as heretofore suggested in the art. When such ingredients are present initially in the film unit, the processing composition is formed by contacting the product with a suitable aqueous medium to form a solution of these ingredients. The alkali employed may be any of the alkaline materials heretofore employed, such as sodium or potassium hyroxide.

The silver halide solvent also may be any of the heretofore known materials, such as sodium or potassium thiosulfate, sodium thiocyanate or uracil; also the thioether-substituted uracils, pseudo-uracils and other compounds disclosed and claimed in U.S. Pat. No. 4,126,459; the 1,3-disulfonylalkanes and cycloalkanes of U.S. Pat. Nos. 3,769,014 and 3,958,992, respectively; or the alkanes containing an intralinear sulfonyl group and, e.g., an intralinear N-tosylsulfimido or N-tosylsulfoximido group as disclosed and claimed in U.S. Pat. No. 4,107,176. Also, a silver halide solvent precursor may be used such as those disclosed in U.S. Pat. No. 3,698,898 and as disclosed and claimed in copending U.S. patent application Ser. No. 382,479 filed May 27, 1982.

Examples of silver halide developing agents that may be employed are hydroquinone and substituted hydroquinones, such as tertiary butyl hydroquinone, 2,5-dimethyl hydroquinone, 4'-methylphenylhydroquinone; pyrogallol and catechols, such as catechol, 4-phenyl catechol and tertiary butyl catechol; aminophenols, such as 2,4,6-diamino-orthocresol; 1,4-diaminobenzenes, such as p-phenylenediamine, 1,2,4-triaminobenzene and 4-amino-2-methyl-N,N-diethylaniline; ascorbic acid and its derivatives, such as ascorbic acid, isoascorbic acid and 5,6-isopropylidene ascorbic acid and other enediols, such as, tetramethyl reductic acid; hydroxylamines, such as N,N-di-(2-ethoxyethyl)hydroxylamine, N,N-di-(2-methoxyethyl)hydroxylamine and N,N-di-(2-methoxyethoxyethyl)hydroxylamine; and heterocyclic compounds, such as, 1-phenyl-3-pryazolidone and 4-methyl-4-hydroxymethyl-1-phenyl-3-pyrazolidone.

Usually, though not necessarily, the processing composition includes a viscosity-increasing reagent such as a cellulosic polymer, e.g., sodium carboxymethyl cellulose, hydroxyethyl cellulose, carboxymethyl hydroxyethyl cellulose, etc; an oxime polymer, e.g., polydiacetone acrylamide oxime; or other high molecular weight polymers.

In addition to the aforementioned ingredients, the processing composition also may contain antifoggants, preservatives and other materials as are conventionally used in the art.

The processing composition may be applied to the photosensitive element, for example, by coating, dipping, spraying or by the use of a rupturable container or pod such as disclosed in U.S. Pat. No. 2,543,181, the container being positioned in the film unit so as to be capable upon rupturing of spreading its contents in a substantially uniform layer.

The photosensitive element may be any of those conventionally employed and generally comprises a silver halide emulsion carried on a base, for example, glass, paper or plastic film, such as cellulose triacetate film, polyethylene terephthalate film, polystyrene film and polyolefin films, e.g., polyethylene and polypropylene films. The silver halide may be a silver chloride, iodide, bromide, iodobromide, chlorobromide, etc. The binder for the halide, though usually gelatin, may be a suitable polymer such as polyvinyl alcohol, polyvinyl pyrrolidone and their copolymers.

Depending upon the particular photographic system, a mordant for the dye image may be used in association with the photosensitive layers as discussed above, or a separate image-receiving element may be employed. The image-receiving layer, i.e., dyeable stratum may comprise any of the materials known in the art, such as polyvinyl alcohol, gelatin, etc., preferably containing a mordant for the transferred image dye(s). The dyeable stratum can be in the same element as the photosensitive layer or it may be in a separate element as appropriate for a given photographic process.

In diffusion transfer processes employing an aqueous alkaline processing composition, it is well known to employ an acid-reacting reagent in a layer of the film unit to lower the environmental pH following substantial dye transfer in order to increase the image stability. For example, the previously mentioned U.S. Pat. No. 3,415,644 discloses systems wherein the desired pH reduction may be effected by providing an acid-reacting layer adjacent the dyeable stratum. These layers may comprise polymers which contain acid groups, e.g., carboxylic acid and sulfonic acid groups, which are capable of forming salts with alkali metals or with organic bases; or potentially acid-yielding groups such as anhydrides or lactones. Preferably the acid polymer contains free carboxyl groups. Alternatively, the acid-reacting reagent may be in a layer adjacent to the silver halide most distant from the image-receiving layer. Another system for providing an acid-reacting reagent is disclosed in U.S. Pat. No. 3,576,625.

An inert interlayer or spacer layer may be disposed between the polymeric acid layer and the dyeable stratum in order to control or "time" the pH reduction so that it is not premature and interferes with the development process. Suitable spacer or "timing" layers for this purpose are described with particularity in U.S. Pat. Nos. 3,362,819; 3,419,389; 3,421,893; 3,455,686; and 3,575,701.

The acid-reacting layer and associated spacer layer are usually contained in the image-receiving element in systems wherein the dyeable stratum and photosensitive strata are contained on separate supports, e.g., between the support for the receiving element and the dyeable stratum. In integral film units, these layers may be associated with the dyeable stratum, e.g., on the side of the dyeable stratum opposed from the photosensitive element or, if desired, they may be associated with the photosensitive strata, as is disclosed, for example, in U.S. Pat. Nos. 3,362,821 and 3,573,043. In film units such as those described in the aforementioned U.S. Pat. Nos. 3,594,164 and 3,594,165, they also may be contained on the spreader sheet employed to facilitate application of the processing composition.

In addition to the aforementioned layers, the film units may contain additional layers as commonly used in the art, such as a layer of antihalation dye, and/or a layer of filter dye arranged between differentially color-sensitive emulsion layers. Depending upon the particular photographic system, it may be desirable to use anti-halation and filter dyes which become decolorized during photographic processing.

The invention will now be described further in detail with respect to specific preferred embodiments by way of example, it being understood that these are illustrative only and the invention is not intended to be limited to the materials, conditions, process parameters, etc. recited therein.

EXAMPLE I

Preparation of Compound A

Benzyl chloride (104 g, 1.0 m) was added dropwise to a solution of KOH (112 g, 2.0 m) in a mixture of 100 ml of xylene and 304 g of 1,3-propanediol at 50°–60° C. The solution was then heated at 100° C. for 2 hours. Water (400 ml) was added to the cooled solution and the mixture was extracted twice with 600 ml of methylene chloride. The combined methylene chloride extracts were washed three times with 400 ml of water, dried over MgSO$_4$, filtered and evaporated to a yellow oil which was distilled under vacuum. The 98°–106° C. (1.5 mm) fraction was collected to give 88.7 g of 3-benzyloxypropanol.

To a solution of the alcohol (9.9 g, 0.06 m) in methylene chloride (120 ml) deaerated with nitrogen, triethylamine (8.4 ml, 0.06 m) was added with stirring. The solution was cooled to −78° C., and methane sulfonyl chloride (4.62 ml, 0.06 m) added dropwise. The resultant slurry was warmed to 0° C., stirred two hours, stored overnight at 20° C. then washed with: 100 ml of ice water; 100 ml of ice cold 3% HCl; 100 ml of ice cold 1:1 saturated NaHCO$_3$: water; and water. The methylene chloride layer was dried over Na$_2$SO$_4$ and evaporated without heating to give a thick straw colored oil. Drying under high vacuum gave 14.79 g of the methane sulfonate product.

Alaninol (6.1 ml, 0.0765 m) was added dropwise to a suspension of 50% NaH (3.67 g, 0.0765 m) in 90 ml tetrahydrofuran and 20 ml CH$_3$CN. The mixture was refluxed for 45 minutes with stirring and a solution of the methane sulfonate product (18.5 g, 0.0758 m) in 15 ml of CH$_3$CN was added at the reflux temperature. Heating was continued for 2½ hours followed by standing overnight at room temperature. Ethyl ether (200 ml) was added to the solution which was then washed twice with 125 ml of water. The organic solution was then extracted with 150 ml of 5% HCl. The aqueous acid layer was separated, made alkaline with 100 ml of 10% NaOH and extracted twice with 75 ml of ether. The combined ether extracts were dried over Na$_2$CO$_3$ and Norit, filtered and evaporated to give 7.8 g (48% yield) of the desired aminoether, as a yellow oil b.p. 132°–134° C. (1.75 mm) of the formula

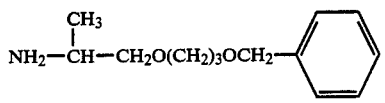

The structure was confirmed by $^1$H NMR spectra.

The crude aminoether (8.1 g) was dissolved in 60 ml of anhydrous ethanol and treated with 5 ml of ethanol saturated with HCl gas. Ethanol (35 ml) was then added to the salt solution. 10% Pd/C catalyst (150 mg) was added and the mixture was hydrogenerated in a Parr shaker at 45 lbs. pressure. The catalyst was filtered off and the ethanol evaporated on a rotary evaporator to give the hydrochloride salt of the aminoalcohol.

The salt was dried under vacuum and dissolved in 30 ml of dimethylformamide. NaOCH$_3$ (2.46 g) and anhydrous methanol (9 ml) were added to the solution with stirring. Argon was used to deaerate the mixture.

Leucoquinizarin (2.70 g, 0.0111 m) was added to the suspension and it was heated to 85° C. for about 48 hours and then the mixture was oxidized with air for about 48 hours.

When the oxidized dye reaction mixture was added to 100 ml of 1% HCl the product oiled out. The product was extracted with methylene chloride and the extracts evaporated to a viscous oil which was dried overnight under vacuum at 80° C. The crude dye was chromatographed on a silica gel column to give 2.7 g (52% yield) of the diol dye of the formula

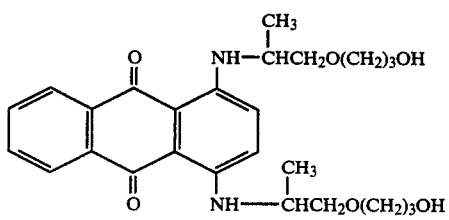

Oxalyl chloride (1.25 ml) was added to 20 ml of dry methylene chloride under argon with stirring. The solution was cooled to −78° C., and dimethylsulfoxide (1.3 ml) added dropwise. After stirring for 5 minutes a solution of the pure diol dye (2.7 g) in 10 ml of dry methylene chloride was added dropwise. The resulting magenta solution was stirred for 20 minutes at −78° C. Triethylamine (6.5 ml) was added dropwise with stirring to produce a suspension which was allowed to warm to 0° C. After 20 minutes methylene chloride (25 ml) was added and the mixture washed with ice water. Additional methylene chloride (25 ml) was added and the mixture washed twice with 50 ml of 1% HCl. The organic phase was dried over $Na_2SO_4$, filtered and evaporated to an oil.

The resultant oil was dissolved in 5 ml absolute ethanol and treated with triethyl orthoformate (5 ml) and 500 mg of toluene sulfonic acid monohydrate. The slightly purple-blue solution was stirred overnight at room temperature. The solution was neutralized with solid $Na_2CO_3$ and an additional ten drops of 10% $Na_2CO_3$ solution was added. The mixture was then stirred for 1 hour, filtered and the solid washed well with ether and the combined filtrate and washings evaporated to an oil. The resulting cyan oil was dried under high vacuum at 80° C. overnight to give 3.13 g of the diacetal dye.

Under argon, a solution of the diacetal dye (1 g) in 10 ml of ether and 10 ml of acetic acid was cooled to 0° C. and treated with 500 mg of zinc dust with vigorous stirring and shaking. After about 5 minutes the solution was yellow-green. Another 15 ml of ether were added and the solution filtered. A small amount of zinc dust was added and the ether and acetic acid removed under vacuum to give an oil. Under argon, the oil was dissolved in ether, treated with 1 ml of 10% $Na_2CO_3$ solution, swirled occasionally for one-half, and evaporated to give an oil.

Under a stream of argon, a solution of dicyclohexylcarbodiimide (2 g) in 15 ml of methylene chloride was cooled to −78° C. and formic acid (731 ml) was added dropwise with stirring. After 10 minutes the urea by-product was filtered off through a glass wool plug at −78° C. by argon pressure and the resulting solution added to the leuco dye oil dissolved in 5 ml of methylene chloride at −78° C. The reaction mixture was allowed to warm to room temperature, stirred overnight and the crude product was chromatographed on silica gel with 15% acetone/85% methylene chloride (v/v) to give 0.64 g of the formylated bis acetal compound.

The bis acetal was dissolved in 15 ml of acetone and 1 ml of water and 1 ml of polyvinylpyridine tosylate salt added. The reaction mixture was refluxed for 18 hours, the catalyst filtered off and washed well with acetone. The combined filtrates were evaporated and the resulting solid dissolved in methylene chloride, dried over $MgSO_4$, the drying agent removed and the solution evaporated and dried under vacuum to give 475 mg of the formylated bis aldehyde compound.

An aminoethanethiol salt (650 mg) of the formula

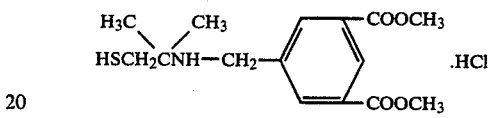

was suspended in a solution of the bis aldehyde compound (475 mg) in 9 ml of methylene chloride and the flask flushed with argon. Triethylamine (250 ml) was added dropwise. In about 5 to 10 minutes an orange solution formed. Molecular sieves (5A, 1 g) was added, the system flushed with argon and the temperature raised to 40° C. and refluxed for 66 hours. The reaction solution was washed twice with cold 1% HCl and once with water, dried over $Na_2SO_4$ and evaporated to give an oil. The crude oil was triturated with 70% ethyl acetate/30% hexane (v/v) to leave a gum. The gum was dissolved in methylene chloride and chromatographed on silica gel using 70% ethyl acetate/30% hexane. The high $R_f$ material was collected. The eluent was evaporated and combined with the previous triturant. The combined solution was rechromatographed and upon evaporation and drying under vacuum an additional amount of the bis formyl thiazolidine tetra ester was obtained.

The formylated anthraquinone thiazolidine ester (0.3 g) was dissolved in 4 ml of $CH_3CN$ and 2 ml of ethanol and cooled to 0° C. 1N KOH (1.4 ml) was added dropwise and the solution stirred for 5 hours at room temperature. Water (25 ml) and Norite were aded and the mixture filtered through Celite to give a reddish solution. The solution was acidified to pH 4 by dropwise addition of 1N HCl to give 0.176 g of a salmon colored solid after filtration and drying. This was shown by a mass spectrum to be a compound A plus compound A monomethyl ester and a small amount of the bis ester.

The aminoether intermediate used in the synthesis of the compound is the subject of copending application Ser. No. 644,911, filed on even date herewith.

The synthetic procedure for formylating the bis aminoanthraquinone dye forms the subject of copending application Ser. No. 644,911, filed on even date herewith.

EXAMPLE II

Compound B was prepared substantially as described in Example I with the exception that valinol was used as the starting material in place of alaninol.

EXAMPLE III

PREPARATION OF COMPOUND C

A solution of aminoether (16.2 g, 0.0726 m) of the formula

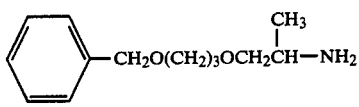

in 50 ml of ethanol was treated with ethanol saturated with HCl gas until the pH was 1 (about 6 ml). 10% Pd/C (200 mg) was added and the material was hydrogenated in a Parr shaker at 40 lbs of pressure. After 30 lbs. uptake the catalyst was removed by filtration under nitrogen, washed with ethanol, and the combined ethanol filtrate and washings evaporated to give a light tan gum which was dried under vacuum at 45° C. for 5 hours to give 11.8 g of the hydrochloric acid salt of the amino alcohol.

The amino alcohol salt (11.5 g, 0.068 m) was added to a 20 ml solution of sodium methoxide (3.6 g) in dry dimethylsulfoxide followed by 1,5-dichloroanthraquinone (3.0 g, 0.0108 m). The mixture was heated to 105° C. under nitrogen with stirring for 72 hours. Methylene chloride (200 ml) was added to the cooled reaction mixture and the solution was washed three times with 200 ml of water, with 200 ml of 5% HCl, and finally 100 ml of water. The methylene chloride layer was separated and dried over MgSO4, filtered, and evaporated to a magenta solid. The dried solid was dissolved in methylene chloride and chromatographed on a silica gel column with 10% acetone/90% methylene chloride (v/v) elutent to give 2.3 g (45% yield) of a magenta solid

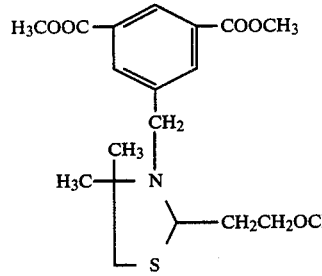

λ max (2-methoxyethanol) 520 nm, ε=14,100.

A solution of dimethylsulfoxide (0.270 ml, 0.00381 m) in dry methylene chloride (8 ml) was cooled to −70° C. in an acetone/dry ice bath. Oxalyl chloride (0.278 ml, 0.00319 m) was added from a syringe with stirring for 5 minutes. A solution of the anthraquinone dye (0.6 g, 0.00127 m) in 6 ml of dry methylene chloride was added from a syringe and the mixture stirred for 25 minutes. Triethylamine (1.06 ml, 0.00636 m) was added and the mixture stirred for 20 minutes. The reaction was allowed to warm to 10° C. during 45 minutes and 50 ml of methylene chloride was added. The reaction mixture was poured into 150 ml of methylene chloride, and the methylene chloride solution washed with 100 ml of water, twice with 100 ml of 1% HCl and then with 100 ml of water. The methylene chloride phase was separated, dried over MgSO4, filtered and evaporated to a magenta glass. The product was chromatographed on a silica gel column from methylene chloride and then eluted with 2% acetone/methylene chloride to give 0.32 g (54% yield) of the bis aldehyde dye

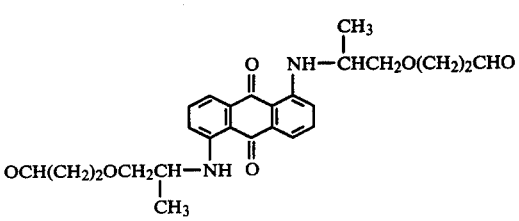

The bis aldehyde dye (0.265 g, 0.000568 m) was dissolved under nitrogen in 5 ml of methylene chloride and treated with 0.354 g (0.00113 m) of an aminoethanethiol of the formula

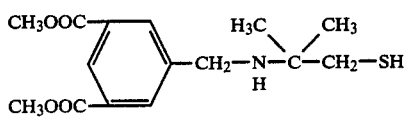

which was obtained from the HCl salt. The reaction mixture was stirred for four hours, 32 μl of acetic acid added and stirring continued overnight. MgSO4 (100 mg) was added and stirring continued for 6 hours. The reaction mixture was diluted with 20 ml of methylene chloride and filtered. The MgSO4 was washed with 30 ml of methylene chloride. The combined filtrates were washed with 50 ml of water, dried with MgSO4, filtered and evaporated to a magenta glass. The magenta glass was dissolved in 10 ml of methylene chloride and chromatographed on a silica gel column with 30% acetate/hexane (v/v) eluent to give 0.447 g (75% yield) of the aminoanthraquinone dye of the formula

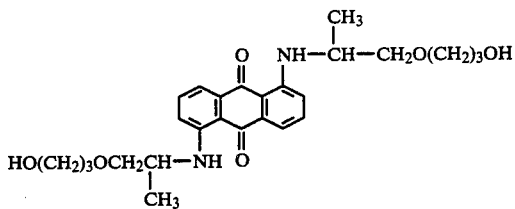

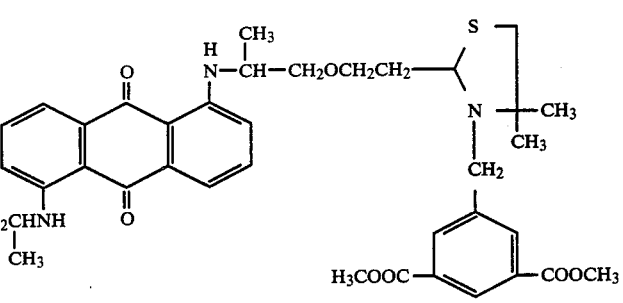

λ max (2-methoxyethanol) 520 nm, ε=13,400; 550 nm, ε=12,000.

The aminoanthraquinone dye (0.6 g, 0.000569 m) was dissolved in 10 ml of dry methylene chloride and zinc dust (0.4 g) added. The mixture was purged with nitrogen, cooled to −5° C. in an ice bath and 98% formic acid (0.343 ml) added from a syringe. The mixture was stirred for one-half hour at −5° C. Under rapid flow of nitrogen additional zinc dust (0.5 g) was added. After 10 minutes the mixture turned an orange color. The mixture was cooled to −60° C. in an acetone/dry ice bath and a solution of 1.8 g (0.0091 m) of 1,3-dicyclohexylcarbodiimide in 12 ml of dry methylene chloride added from a syringe. The mixture was allowed to stir at −50° C. for three hours and then overnight at room temperature. Methylene chloride (320 ml) was added and the zinc and precipitated solid filtered off and washed with 50 ml of methylene chloride. The combined methylene chloride fractions were washed with saturated NaHCO$_3$ solution then with water, dried and evaporated to a glassy residue. The crude product was dissolved in 30 ml of carbon tetrachloride, cooled to 0° C. and the precipitate filtered off. The carbon tetrachloride solution was chromatographed on a silica gel column, eluted first with 30% ethyl acetate/70% hexane (v/v), then with 50% ethyl acetate/50% hexane (v/v) and finally with 80% ethyl acetate/20% hexane (v/v) to give 0.48 g (76% yield) of a yellow glass, the formylated anthraquinone bis thiazolidine ester. λ max (2-methoxyethanol) 230 nm, ε=40,000; 280 nm, ε=10,000(s); 290 nm, ε=8200(s).

The formylated anthraquinone thiazolidine ester (0.35 g, 0.0003155 m) was dissolved in 4 ml of CH$_3$CN and 2 ml of methanol, cooled to 5° C., 0.7 ml of 0.5N NaOH was added dropwise and the solution stirred at 5° C. for 4 hours. The solution was refrigerated overnight. An additional 0.7 ml of 1N NaOH was added and the solution stirred for 4 hours at 5° C. A further 0.7 ml of 1N NaOH was added and the solution stirred at 5° C. for 4 hours. Water (20 ml) was added and the solution filtered. The filtrate was acidified to pH 4 with 1N HCl. A pink precipitate formed. Water (50 ml) was added and the solution extracted four times with 75 ml of ethyl acetate. The ethyl acetate extracts were dried over MgSO$_4$, filtered and evaporated to a pinkish solid. The crude product was dissolved in ethyl acetate and precipitated with hexane to give about 0.125 g of a pink solid. Evaporation of the hexane gave about 100 mg of a redder material. A mass spectrum showed the product was compound C mixed with mono ester and bis ester. λ max (2-methoxyethanol) 296 nm, ε=7,600; 320 nm, ε=4,000.

The aminoethanethiol intermediate used in the preparation of compounds A, B and C is disclosed and claimed in copending application Ser. No. 644,913, of Paul McGregor and Myron Simon, filed on even date herewith.

EXAMPLE IV

PREPARATION OF COMPOUND D

A solution of 2-aminoethanol (18.1 ml, 0.3 m) in 100 ml of dimethylformamide was deaerated with nitrogen for one-half hour. Leucoquinizarin (12.1 g, 0.05 m) was added to the solution in several portions with stirring under nitrogen. An orange solution formed. The solution was stirred under nitrogen at 70°–75° C. for 6 hours and then overnight at room temperature. The solution was heated at 80° C. for 8 hours with air bubbling through it. The solid dye came out of solution upon cooling to room temperature. The mixture was poured into 2 liters of water and the solid collected by filtration. The dye was washed with one liter of water, dried in air, dissolved in ethyl acetate and precipitated out of solution with hexane. The resulting blue solid was collected by filtration and dried under vacuum to give 13.3 g (81% yield) of

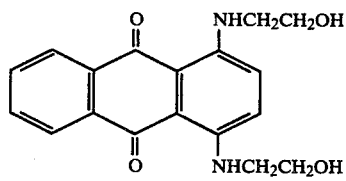

m.p. 238°–240° C., λ max (2-methoxyethanol) 590 nm (ε=15,500), 635 nm (ε=20,200).

Formic acid 97%, (51.6 ml) was added dropwise at room temperature over a one hour period to an acetic anhydride solution (122.4 ml). The mixture was heated to 55° C. for 2½ hours, cooled and the anthraquinone dye (5 g, 0.0153 m) was added. The reaction mixture was heated at 50°–55° C. for 17 hours. The cooled reaction mixture was diluted with 150 ml of methylene chloride and poured thorugh a silica gel column wet with hexane. The column was eluted with methylene chloride to remove the mono formylated-product and then eluted with 10% acetone/90% methylene chloride (v/v) and then with 15% acetone/85% methylene chloride to obtain the desired yellow formylated compound,

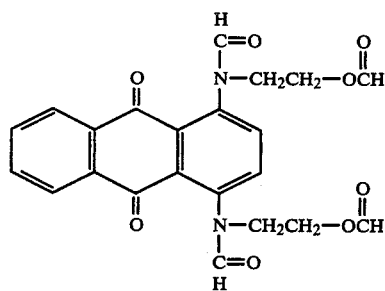

The ester-amide was dried under vacuum to give 3.46 g (48.5% yield), m.p. 188°–189° C., λ max (2-methoxyethanol) 330 nm, ε=4,000.

The ester-amide (0.4 g, 0.000857 m) in a solution of 10 ml of ethanol, 1 ml water, 10 ml acetone and 0.1 ml of 1N HCl was heated to reflux for 4 hours, the reaction mixture cooled, poured into 50 ml of methylene chloride and then the dried organic phase was chromatographed on a silica gel column. The column was eluted with methylene chloride and then with acetone to obtain the desired product which was vacuum dried overnight to give 0.18 g of a light yellow solid, the bis formamide diol

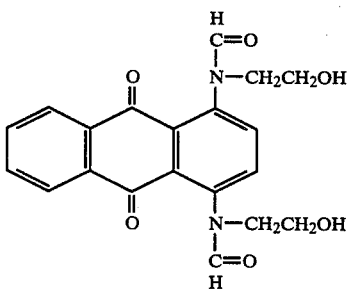

m.p. 206°–209° C. (dec.) λ max (2-methoxyethanol) 251 nm, ε=43,200; 300 nm, ε=5,200; 320 nm, ε=46,000.

The yellow bis formamide diol (0.642 g, 0.00168 m) was dissolved in 30 ml methylene chloride and 5 ml acetone and 0.844 g (0.00336 m) of the thiazolidine acid

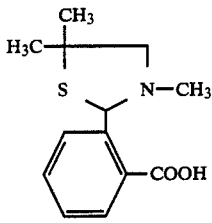

was added. 1,3-dicyclohexylcarbodiimide (0.692 g, 0.00336 m) was added to the solution which was then stirred at room temperature under nitrogen for 16 hours. The resulting urea by-product was collected by filtration and washed with 100 ml of methylene chloride. The solution and washings were combined, evaporated to about 15 ml and chromatographed on a silica gel column. The column was eluted with 5% acetone/95% methylene chloride, and the eluent was evaporated to give 0.54 g of crude product, compound D.

The crude product (300 mg) was dissolved in 20 ml of methanol to which 20 ml of water were then added. Upon standing a light yellow solid formed which was collected by and dried under vacuum to give 250 mg of compound D, a light yellow solid, m.p. 104°-107° C., λ max (2-methoxyethanol) 250 nm, $\epsilon = 30,000$.

EXAMPLE V

A film unit was prepared wherein a transparent polyester film base was coated with the following layers in succession:

1. a mordant layer coated at a coverage of about 3229 mg/m² of a graft copolymer comprised of 4-vinylpyridine (4VP) and vinyl benzyltrimethylammonium chloride (TMQ) grafted onto hydroxyethylcellulose (HEC) at a ratio HEC/4VP/TMQ of 2.2/2.2/1 and about 54 mg/m² of 1,4 butanediol diglycidyl ether;
2. a layer comprising about 430 mg/m² of compound C and about 430 mg/m² of polyvinylpyrrolidone;
3. a silver iodobromide emulsion layer comprising about 130 mg/m² of silver and about 645 mg/m² of gelatin;
4. a layer of about 320 mg/m² of gelatin and about 27 mg/m² of succindialdehyde.

The film unit was passed through a pair of rollers at a gap spacing of 51 microns together with a transparent polyester film base cover sheet at room temperature without any exposure and processed with a processing position made up as follows:

|  | Weight Percent |
|---|---|
| NaOH | 5.0 |
| Sulfolane | 20.0 |
| Hydroxyethylcellulose | 3.0 |
| Water | 72.0 |

The processed film unit was placed in a spectrophotometer and the absorption spectrum was recorded repetitively over a period of time. The transmission density was measured at 520 nm (λ max for compound C).

| Transmission Density | |
|---|---|
| Initial | 0.15 |
| 10 Minutes | 0.22 |
| 38 minutes | 0.28 |

The experiment described above was repeated with the exception that 0.5% of sodium thiosulfate, a silver halide solvent, was added to the processing composition. At 10 minutes after processing the transmission density of the film unit was 0.42. The addition of the silver halide solvent to the processing composition caused a substantial increase in the amount of dye transferred.

A film unit as described above was exposed through the base in the dark to a test target with blue light (4 mcs) and processed as above with a processing composition made up as follows:

|  | Weight Percent |
|---|---|
| NaOH | 5.0 |
| Sulfolane | 20.0 |
| Sodium thiosulfate | 0.5 |
| 4'-methylphenylhydroquinone | 0.3 |
| Carboxymethyl Hydroxyethyl Cellulose | 3.0 |
| Water | 71.2 |

After an 8 minute imbibition period the film unit was dipped into 2% acetic acid solution to stop development, peeled apart and allowed to dry. A well developed magenta image was obtained. The transmission density at 520 nm was 0.33.

The $D_{max}$ and $D_{min}$ values to red, green and blue light, respectively were:

|  | $D_{max}$ | $D_{min}$ |
|---|---|---|
| Red | 0.04 | 0.03 |
| Green | 0.30 | 0.09 |
| Blue | 0.11 | 0.05 |

EXAMPLE VI

A photosensitive element was prepared comprising a transparent polyester photographic film base having the following layers coated therein in succession.

1. about 430 mg/m² of the methyl ester precursor of compound A and about 430 mg/m² of cellulose acetate hydrogen phthalate;
2. a silver iodobromide emulsion layer comprising about 130 mg/m² of silver and about 645 mg/m² of gelatin;
3. a layer comprising about 320 mg/m² of gelatin and about 27 mg/m² of succindialdehyde.

A positive element was prepared comprising a transparent polyester photographic film support and a mordant layer as described in Example V.

The photosensitive element was exposed to a test target in the dark with blue light (4 mcs) and then passed, together with the positive element, through a pair of rollers at a gap spacing of 51 microns and processed with a processing composition made up as follows:

| | Weight Percent |
|---|---|
| NaOH | 5.0 |
| Sulfolane | 20.0 |
| Sodium Thiosulfate | 0.5 |
| 4'-methylphenylhydroquinone | 0.3 |
| Carboxymethylhydroxyethylcellulose | 3.0 |
| Water | 71.2 |

After an imbibition period of 10 minutes the film unit was dipped in 2% acetic acid to stop development and dried. A well developed cyan image was obtained. The $D_{max}$ and $D_{min}$ values for red, green and blue light respectively were:

| | $D_{max}$ | $D_{min}$ |
|---|---|---|
| Red | 0.55 | 0.17 |
| Green | 0.30 | 0.21 |
| Blue | 0.14 | 0.18 |

EXAMPLE VII

A photosensitive element was prepared wherein a transparent polyester photographic film support was coated with the following layers in succession:

1. a layer comprising about 430 mg/m² of compound D and about 430 mg/m² of cellulose acetate hydrogen phthalate;

2. a silver iodobromide emulsion layer coated at a coverage of about 129 mg/m² of silver (1.6 microns) and about 646 mgs/m² of gelatin;

3. a layer comprising about 323 mg/m² of gelatin and about 27 mg/m² of succindialdehyde.

A positive sheet was prepared comprising a transparent polyester photographic film base on which the following layers were coated in succession:

1. as a polymeric acid layer approximately 9 parts of a ½ butyl ester of polyethylene/maleic anhydride copolymer and 1 part of polyvinylbutyral coated at a coverage of about 26910 mg/m²;

2. a timing layer comprising about 2570 mg/m² of a 60-29-6-4-0.4 pentapolymer of butylacrylate, diacetone acrylamide, methacrylic acid, styrene and acrylic acid,;

3. a polymeric image receiving layer of: (a) 3 parts of a mixture of 2 parts polyvinylalcohol and 1 part of poly-4-vinylpyridine and (b) 1 part of a graft copolymer comprised of 4-vinylpyridine (4VP) and vinylbenzyl-trimethyl-ammonium chloride (TMQ) grafted onto hydroxy-ethyl cellulose (HEC) at a ratio of HEC/4VP/TMQ of 2.2/2.2/1 coated at a coverage of about 3220 mg/m²).

The photosensitive and positive elements were passed together through a pair of rollers at a gap spacing of 51 microns and processed with a processing composition made up as follows:

| | Weight Percent |
|---|---|
| NaOH | 10.0 |
| Sodium Thiosulfate | 1.0 |
| Carboxymethylhydroxyethyl cellulose | 2.0 |
| Water | 87.0 |

After an imbibition period of 10 minutes the film unit had a transmission density of 0.17. The film unit had a uniform cyan color.

Although the invention has been described with respect to specific preferred embodiments, it is not intended to be limited thereto but rather those skilled in the art will recognize that variations and modifications made by made therein which are within the spirit of the invention and the scope of the appended claims.

What is claimed is:

1. A compound represented by the formula

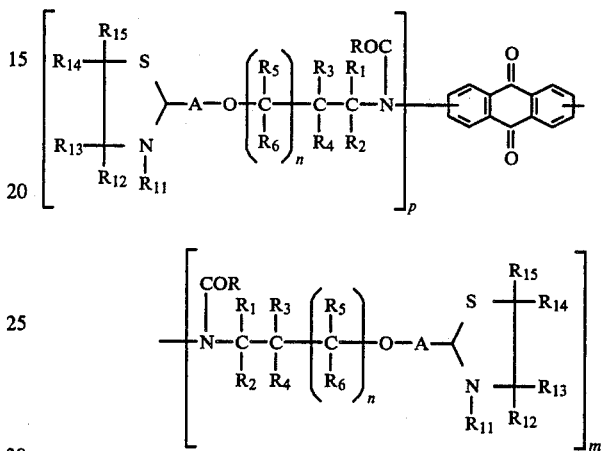

wherein R is hydrogen, alkyl having from 1 to 6 carbon atoms or phenyl or pyridyl; $R_1$, $R_2$, $R_3$, $R_4$, $R_5$ and $R_6$ are each independently hydrogen, alkyl having from 1 to 6 carbon atoms or phenyl; A is

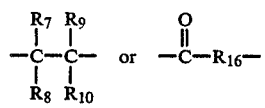

$R_7$, $R_8$ and $R_9$ are each independently hydrogen, alkyl having from 1 to 6 carbon atoms, phenyl, benzyl or phenethyl; $R_{10}$ is hydrogen or carboxy; $R_{11}$ is alkyl having from 1 to 6 carbon atoms, phenyl, benzyl or phenethyl; $R_{12}$ is hydrogen, carboxy, dialkylcarboxamido, alkyl having from 1 to 6 carbon atoms, phenyl, benzyl or phenethyl; $R_{13}$, $R_{14}$ and $R_{15}$ are each hydrogen, alkyl having from 1 to 6 carbon atoms, phenyl, benzyl or phenethyl; $R_{16}$ is alkylene having 2 or 3 carbon atoms or phenyl; n is 0 or 1; m is 1 or 2; and p is 0, 1 or 2.

2. A compound as defined in claim 1 wherein R is hydrogen or alkyl having from 1 to 6 carbon atoms; $R_1$, $R_2$, $R_3$, $R_4$, $R_5$ and 6 are each independently hydrogen or alkyl having from 1 to 6 carbon atoms; $R_7$, $R_8$ and $R_9$ are each independently hydrogen or alkyl having from 1 to 6 carbon atoms; $R_{10}$ is hydrogen, $R_{11}$ is benzyl, $R_{12}$, $R_{13}$, $R_{14}$ and $R_{15}$ are each alkyl having from 1 to 6 carbon atoms; and $R_{16}$ is phenyl.

3. A compound as defined is claim 2 wherein n is 0; m is 2 and p is 0.

4. A compound as defined in claim 3 wherein $R_{12}$ and $R_{13}$ are each methyl.

5. A compound as defined in claim 3 wherein n is 0; m is 1 and p is 1.

6. A compound as defined in claim 5 wherein $R_{12}$ and $R_{13}$ are each methyl.

* * * * *